Dec. 11, 1956   D. RAGLAND   2,773,568
NON-SELF-ENERGIZING BAND TYPE BRAKE
Filed Feb. 19, 1954
FIG. 1.
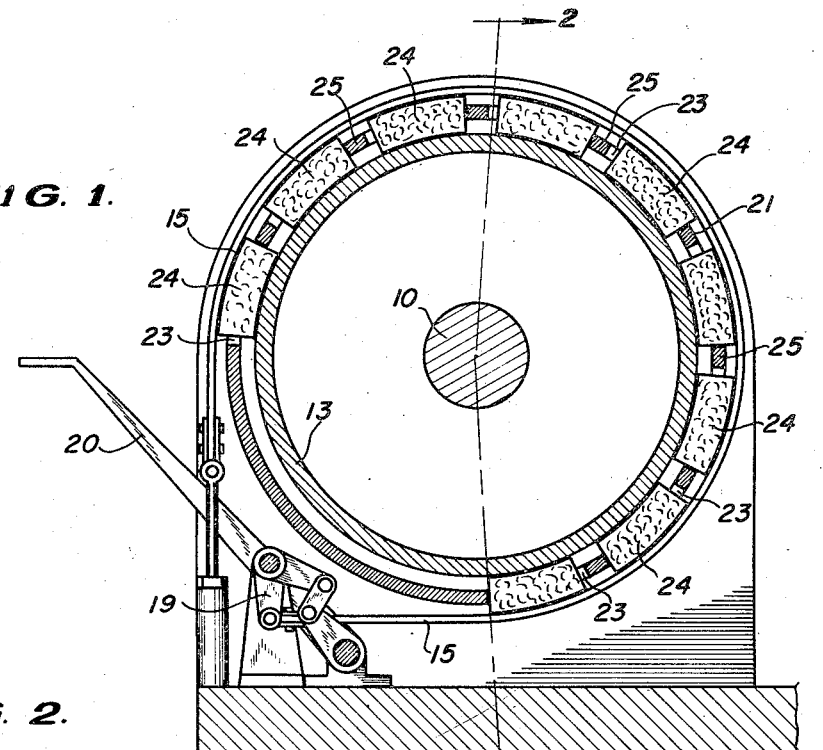
FIG. 2.
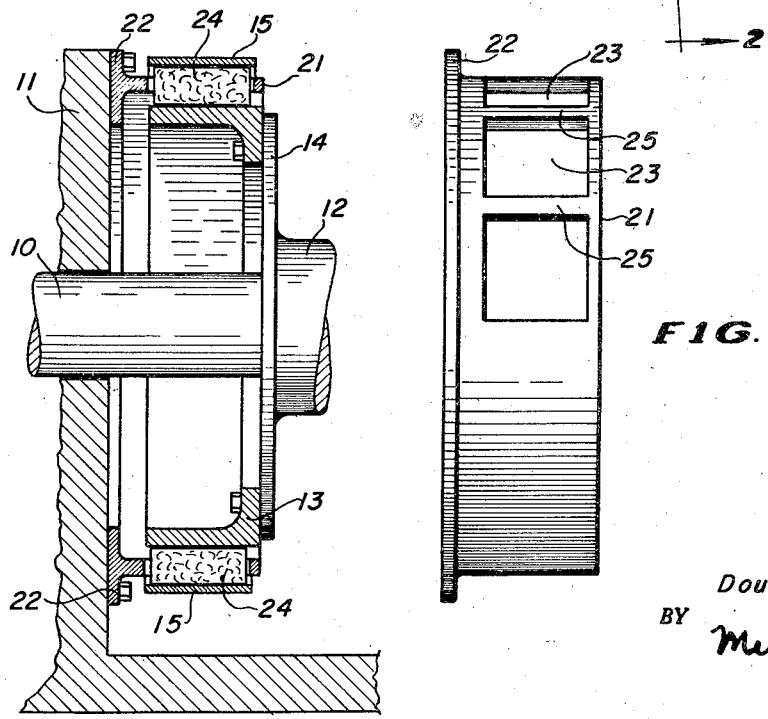
FIG. 3.
INVENTOR.
Douglas Ragland,
BY *Melvin F. Tuneka*
ATTORNEY.

United States Patent Office 2,773,568
Patented Dec. 11, 1956

2,773,568

NON-SELF-ENERGIZING BAND TYPE BRAKE

Douglas Ragland, Houston, Tex., assignor, by mesne assignments, to Esso Research and Engineering Company, Elizabeth, N. J., a corporation of Delaware Application February 19, 1954, Serial No. 411,489

5 Claims. (Cl. 188—77)

This invention relates to an improvement in band type brake mechanisms and more particularly to a means for eliminating the usual mechanical connections between the friction material and the brake band or brake rim.

In present practice, the band type brake mechanisms utilized for heavy duty work such as those used on the drawworks of oil drilling equipment, include friction material which is mechanically connected to either the brake band or the brake rim. The mechanical connections are usually effected by the use of rivets or bolts. These conventional brake mechanisms, because of the aforementioned mechanical connections, have the disadvantage of being influenced by a rotational force in addition to the applied force when the brake is applied. This rotational force or "self-energization" is highly undesirable as the operator has difficulty in judging how much force to apply to the brake mechanism since the force actually applied to the brake consists of the "self-energization" in addition to the force applied.

It is an object, therefore, of this invention to provide a means for loosely confining the friction material between the brake band and the brake rim in a manner so as to prevent the friction material from tending to rotate in the same direction as the rotation of the brake rim, thereby making the brake non-self-energizing. It is a further object of this invention to provide a means for confining the friction material without the utilization of a mechanical connection between the brake band and the friction material thereby facilitating the replacement of worn-out friction material.

Briefly described, my new "non-self-energizing band type brake" comprises a means for applying a braking force to a rotating brake rim. The means for applying the braking force may include, for example, a brake band. The friction blocks which are applied against the brake rim when the brake band is applied are loosely confined between the brake band and the brake rim by means of a stationary member such as a stationary spider. The spider is mounted on a jack post and has a plurality of openings adapted to hold the friction material. These openings are, in general, rectangular though it is to be understood that they need not necessarily be rectangular but may be of any shape, and are larger than the friction material blocks so that a friction block may float within the confines of each opening.

Still further objects and advantages will be manifest from the following description and the accompanying drawings in which:

Fig. 1 is a sectional elevation of my improved non-self-energizing band type brake;

Fig. 2 is a partial cross-sectional view taken along lines 2—2 of Fig. 1; and

Fig. 3 is a side view of the spider.

Referring more particularly to the drawing, numeral 10 is a shaft which is rotatably journaled within a jack post 11 (Fig. 2). Keyed upon the shaft 10 is a cable drum which is indicated as a whole by numeral 12. Integrally attached to the cable drum 12 is a brake rim 13 with a brake flange 14 interconnecting the cable drum 12 and the brake rim 13. A means for applying a braking force to the rotatable brake rim 13, such as a brake band 15, is provided. One end of the brake band 15 is rigidly attached in any manner with a fixed part of the mechanism. The other end of band 15, the live end, is actuated by the brake handle 20 through a linkage system 19 to apply a braking force. It is, of course, understood that the exact manner in which the ends of the brake band are secured and the shiftable end of the band is actuated to tighten it about the brake rim may take the form of other suitable means and the actuating means herein shown is merely illustrative.

To prevent self-energization, I provide a stationary member 21, such as a spider, which is mounted to the jack post 11 by means of a mounting flange 22. The stationary member 21 has disposed about its periphery a plurality of openings 23 and is mounted upon the jack post 11 in a manner so as to place the plurality of openings 23 between the brake band 15 and the rotatable brake rim 13. A plurality of friction blocks 24 are placed within the plurality of openings with one friction block being confined within each opening. It is clear from an inspection of Fig. 1 that the circumferential space of each opening 23 is larger than the circumferential space occupied by each friction block 24 thus permitting limited circumferential movement of the friction blocks 24.

In operation, therefore, assuming the cable drum 12 is rotating in a clockwise direction, upon application of the braking force, the friction blocks 24 will have a tendency to rotate in a clockwise direction and apply a rotational force against the brake rim. However, the friction blocks will be stopped in their rotational movement by means of the friction block separating members 25 and further rotation of the blocks will be prevented. Therefore, there will be no self-energization of my new type brake. There also will be no tendency for the brake to grab when applied or kick due to the backward rotation of the rim when the brake band is released. Both of the foregoing features are inherent defects of the conventional band type brake. Since the brake is non-self-energizing its sensitivity and linearity as a feed-off device will be good. Another advantage inherent in my improved brake mechanism is the fact that the braking effect produced by each piece of friction material will be the same regardless of its position relative to the live end and dead ends of the brake band. Therefore, wear of the friction material will be uniform. Also replacement of the friction material will be facilitated because it is not mechanically connected to any other part of the brake mechanism.

It is to be understood that while I have illustrated and described a preferred embodiment of my invention I do not wish to be limited to this precise construction as it is obvious that many changes and modifications may be made without departing from the spirit and scope of my invention.

What I claim is:

1. In combination with a band type brake mechanism including a brake rim and a brake band, a stationary member having a plurality of openings therein mounted so as to dispose said plurality of openings outside the periphery of said brake rim and inside the periphery of said brake band, and friction material loosely confined within each of said stationary member openings to provide for limited circumferential movement of said friction material.

2. In combination with a brake mechanism including a rotatable brake rim and means for applying a braking force to said rotatable brake rim, the improvement of stationary means circumferentially arranged between said brake rim and said means for applying a braking force for loosely confining a plurality of friction blocks between said rotatable brake rim and said means for applying a braking force to said rotatable brake rim, said stationary member having separating members for separating said friction blocks.

3. In a non-self-energizing band type brake, a rotatable cable drum, a brake rim, a brake flange interconnecting said cable drum and said brake rim, a brake band, and a means disposed circumferentially between said brake rim and said brake band and separated from both said brake rim and said brake band, said means being adapted to loosely confine friction material between said brake rim and said brake band.

4. A non-self-energizing band type brake in accordance with clam 3 wherein the means for loosely confining said friction material consists of a member having a plurality of openings, said friction material being disposed within said openings.

5. In a non-self-energizing band type brake for use on drawworks, a rotatable cable drum, a brake rim, a brake flange interconnecting said cable drum and said brake rim, a jack post, a stationary spider mounted on said jack post, said stationary spider having a plurality of openings coaxially disposed about said brake rim, a brake band coaxially disposed about said stationary spider, and friction blocks loosely confined within each of said stationary spider openings.

References Cited in the file of this patent

UNITED STATES PATENTS

| | | |
|---|---|---|
| 425,955 | Peirce | Apr. 15, 1890 |
| 1,752,377 | Glueck | Apr. 1, 1930 |
| 1,853,201 | Buscher | Apr. 12, 1932 |
| 2,136,111 | Laurent | Nov. 8, 1938 |
| 2,308,954 | Hatch | Jan. 19, 1943 |

FOREIGN PATENTS

| | | |
|---|---|---|
| 336,412 | France | Jan. 14, 1904 |
| 521,091 | Germany | Mar. 18, 1931 |